(12) United States Patent
Trinh et al.

(10) Patent No.: US 8,954,879 B2
(45) Date of Patent: Feb. 10, 2015

(54) METHOD AND APPARATUS FOR SHARING USER SERVICE CLASSES

(75) Inventors: Trung (Tim) Trinh, Nepean (CA); Jeffrey Hobbs, Kanata (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 121 days.

(21) Appl. No.: 12/802,360

(22) Filed: Jun. 4, 2010

(65) Prior Publication Data
US 2011/0302523 A1    Dec. 8, 2011

(51) Int. Cl.
*G06F 3/048* (2013.01)
*G06F 17/30* (2006.01)
*G06Q 10/10* (2012.01)

(52) U.S. Cl.
CPC .............. *G06F 17/30* (2013.01); *G06Q 10/105* (2013.01)
USPC ........................................................ 715/780

(58) Field of Classification Search
USPC ........................................................ 715/780
See application file for complete search history.

(56) References Cited

U.S. PATENT DOCUMENTS

| | | | |
|---|---|---|---|
| 7,324,972 B1 | 1/2008 | Oliver et al. | |
| 2002/0055924 A1 | 5/2002 | Liming | |
| 2003/0167323 A1* | 9/2003 | Motoyama et al. | 709/223 |
| 2003/0195765 A1* | 10/2003 | Sehgal et al. | 705/1 |
| 2004/0249788 A1* | 12/2004 | Dant | 707/1 |
| 2005/0198216 A1* | 9/2005 | Behera et al. | 709/220 |
| 2007/0250481 A1* | 10/2007 | Fiedler | 707/3 |
| 2007/0276864 A1* | 11/2007 | Espelien | 707/103 X |
| 2008/0037463 A1 | 2/2008 | Gopal | |
| 2008/0046433 A1* | 2/2008 | Kool-Brown et al. | 707/9 |
| 2011/0016432 A1* | 1/2011 | Helfman | 715/843 |

* cited by examiner

*Primary Examiner* — William Bashore
*Assistant Examiner* — Rayeez Chowdhury

(57) ABSTRACT

This disclosure describes a system in which individual employee records can be updated across multiple services by an administrator at the interface to a particular service. Multiple services may be provided with this capability. This will eliminate the need in the current art for a central directory that contains a service description that will be common across all services. The technology eliminates the need for the development of this directory and the training of administrators in its interface. Administrators may utilize their training in one service interface to update records across multiple services. This will enable the more rapid development of solutions utilizing services from multiple vendors. Administrators need not be trained on interfaces for all services but can apply routine global updates from a convenient and familiar interface.

17 Claims, 5 Drawing Sheets

| Attribute | Value |
|---|---|
| 1 | On |
| 2 | Off |
| 3 | Eval (exp 1) |
| 4 | ftp://mitel.com/wset |
| 5 | Manager |
| 6 | Level 5 |
| 7 | 64 |
| 8 | Ann Rowe |
| 9 | Off |

Service 2 Template

Figure 4

METHOD AND APPARATUS FOR SHARING USER SERVICE CLASSES

FIELD OF THE INVENTION

The present invention relates to methods and apparatuses for sharing user service classes and is particularly concerned with doing so across multiple disparate services or software vendors.

BACKGROUND TO THE INVENTION

FIG. 1 illustrates a known enterprise system for providing services. An enterprise 100 organizes its operations in order to efficiently perform its business. Employees 102 are grouped into departments, divisions, work groups, task forces, teams etc to perform the work required by the enterprise in the usual course of its business. These groups may be relatively permanent or generated dynamically to perform certain tasks. Employees are assigned to these groups and fulfill certain roles 104 within them. For example one employee may perform the role of CEO while others may be clerks in the payroll office. Management 106 at all levels analyze the business requirements of the enterprise and create and adjust the organizational structure of roles to address them.

As described above, employees 102 function within the organization in certain assigned roles 104. Each of these roles has certain responsibilities and certain privileges. The enterprise 100 supplies a number of devices and other services to enable the employees 102 to perform their roles. Such devices as phones within the PBXs, Email, databases, and workflow systems supply various degrees of capabilities. For example, a PBX can limit the ability of certain employees to make certain kinds of toll calls. Payroll clerks may be prevented from accessing long distance toll services while the CEO and sales personnel would have unlimited access to costly international calling. Similarly, the company workflow system grants managers signing authority to authorize certain tasks while preventing others from doing the same. As well as providing capabilities, certain services can be programmed to place requirements on certain employees. For example, a virtual automated call distribution (ACD) system may make use of certain employees as experts in answering certain customer calls. Such ACD systems would be programmed to require these employees to provide a certain portion of their time to this task. These employees would not be allowed to make themselves unavailable to these tasks while at the same time they could make themselves unavailable to other tasks.

FIG. 2 illustrates service provisioning 200 for the system of FIG. 1. The capabilities and limitations that are supplied to employees in these roles are programmed into the various services 202 that the enterprise provides. System administrators 106, who have been trained in the management of the various devices are tasked with doing this. As shown in FIG. 2, each service 202 has one or more attributes 204 that control the capabilities and limitations as they apply to specific employees. These attributes may be grouped into multiple classifications each of which are suited to certain types of roles that employees fulfill. These sets of attributes may be termed classes of service 206 and each role may be assigned one or more of these classes. Examples of these classes of services could be executive, sales, expert, secretary. FIG. 2 shows how the company roles such as CEO, Salesperson and so on may be supplied with the necessary classes of service, which control the programming of the capabilities and limitations of each service. FIG. 2 shows how certain service attributes may be set On, Off or provided with specific values.

Typically, services 202 have multiple management interfaces, provided by disparate vendors, that allow for the setting of these attributes. System administrators are trained on the use of these interfaces and assigned the task of creating and managing user settings on these services. As shown in FIG. 1, the administrators 106 are supplied with the settings of individual employees 102 in their various roles 104 and maintain the services to these settings.

The management of the setting of these attributes can be a costly, time consuming and error prone task for any enterprise. Administrators 106 need to be trained for all programmable services owned by the enterprise. Adding a new employee to these services or modifying the settings for an existing employee necessitates the setting of multiple attributes on multiple services. To address these issues, it is known in the art to provide a central database or directory in which the individual records of each employee in their typically several roles may be stored. This provides a common representation of all services. Agents may then be designed and supplied for all services which will translate these records into the individual setting for each service attribute. This solution does not only require a common directory and agents for each service together with associated hardware on which to run these but also requires a federation of the vendors or a common/known infrastructure between multiple disparate vendors. This can make this solution cost prohibitive for smaller installations that are a major component of the market.

Thus a solution that does not entail the work of multiple trained administrators of the first solution and the costly hardware and directory development of the second solution would be attractive in the marketplace. Additionally, a solution that does not require a constant update of service or class of service definition to be propagated between vendors via a software update, removes restrictions in updating for service enhancements and cross-vendor product alignment issues.

BRIEF DESCRIPTION OF THE DRAWINGS

The present disclosure will be further understood from the following detailed description with reference to the drawings in which:

FIG. 4 illustrates service provision for the system of FIG. 3; and

DETAILED DESCRIPTION

Systems and methods disclosed herein provide for sharing user service classes to address at least some of the aforementioned disadvantages.

It is the object of the current disclosure to provide improved systems and methods in sharing user service classes without the requirement of user interface changes, and/or changes to software base from multi vendors, when there are updates to the service or class of service.

The technology of this disclosure thus allows the updating of attributers across multiple services within an enterprise without requiring a central service and the needed common data representation. It also allows administrators trained on the interface of one service to update records across multiple other services without undergoing training. It eliminates the requirement for multiple administrators to update individual service records for individual employees thus reducing the change of error.

Figure 1:
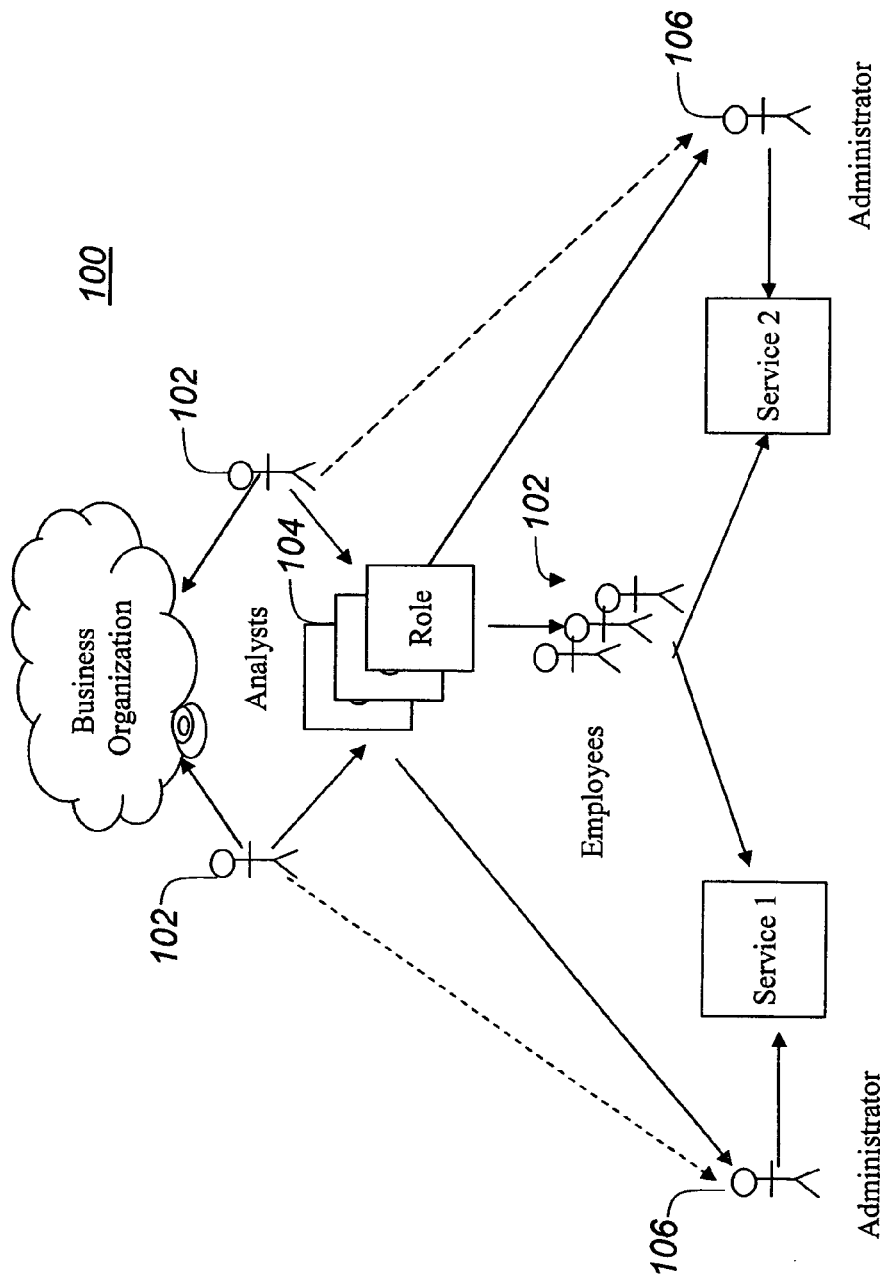
FIG. 1 illustrates a known enterprise system for providing services.
Figure 2:
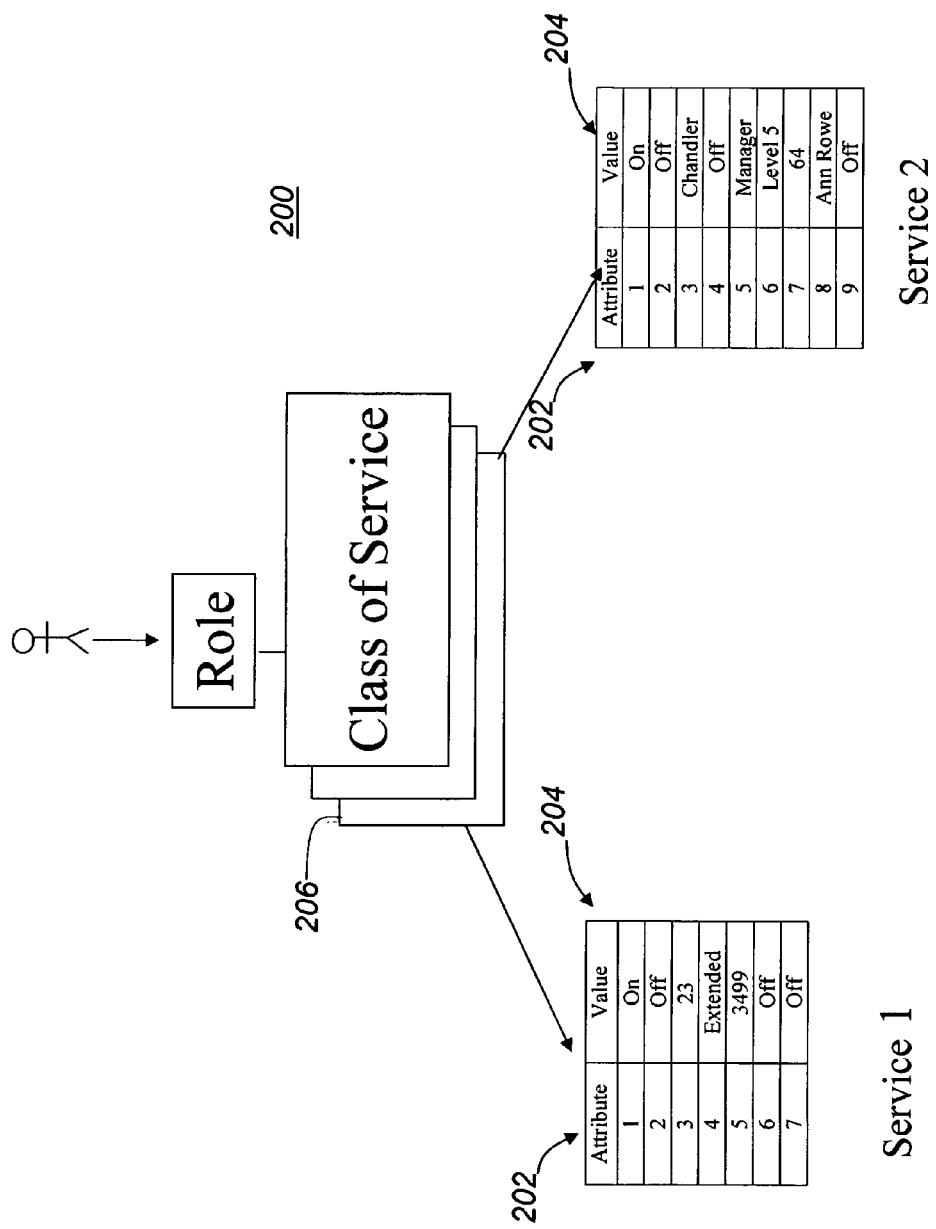
FIG. 2 illustrates service provision for the system of FIG. 1.
Figure 3:
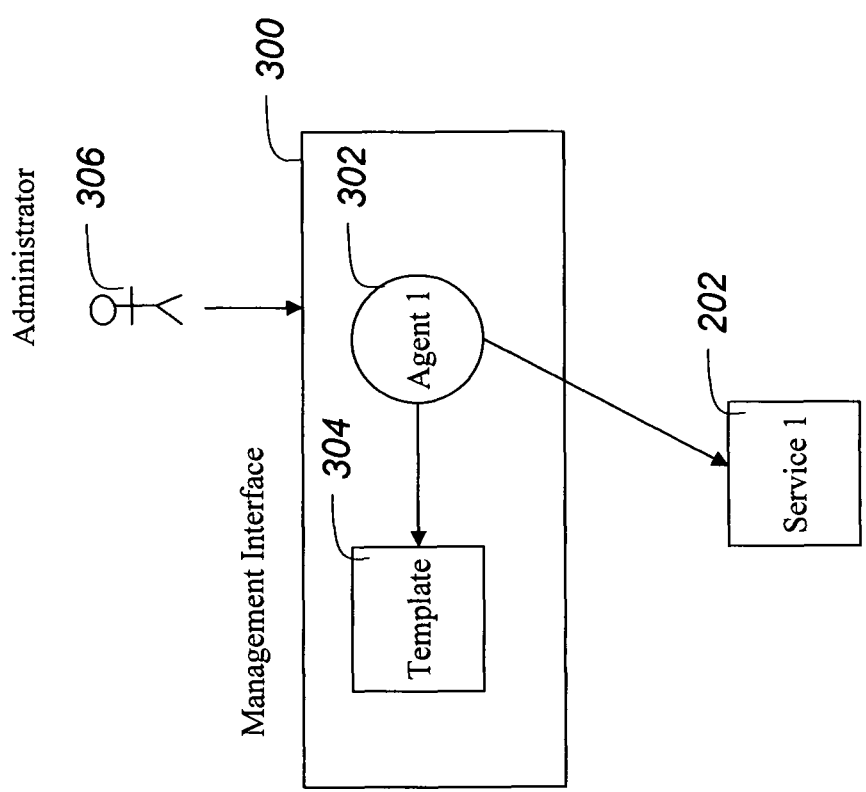
FIG. 3 illustrates a system for sharing of user service classes in accordance with an embodiment.

FIGS. 3 and 4 represent a solution to the deficiencies in the prior art described above. As shown in FIG. 3, the management interface 300 of a service is extended to provide an agent 302 and multiple service templates 304. Each of these service templates 304 contains a description of the required settings for an individual role. Thus, the system administrator 306 would no longer be required to deal with the settings of individual attributes for each employee. Rather the administrator 306 would interact with the agent 302 through the interface 300 to identify the role selected for an individual employee. For example, the interface may provide a drop-down menu for determining values as is further described below. The agent 302 accesses the template 304 created for this role and updates the attribute settings for the service 202.

A representation of the template 400 created for a role may be seen in FIG. 4. Individual values 402 (ON, OFF, Ann Rowe, etc.) may be supplied for any attribute 404. However, with the use of the programmable agent other methods of accessing suitable values may also be provided. For example, Attribute 3 in the template is shown as being set by the expression Eval (exp1). This is an evaluation function that can be used to dynamically select a value for the attribute. Thus attributes whose settings depend on the values of other parameters may be indicated by an evaluation function and require no action by the administrator at the time of entry of an individual employee. For example, an attribute such as the address of a proxy server may depend on the work location of an employee. An employee in the Arizona office may be assigned a different proxy server than an employee in the Oklahoma office.

The evaluation expression may take several forms. For example, it may take the form of a list of predicates. The first predicate that evaluates to true has its result instantiated. The evaluation expression may also be a small program written in a convenient scripting language (proprietary or custom). This program can be run and the output used for the setting of the attribute.

The example of Attribute 4 is shown as being associated with a URL. This URL identifies a location in which a suitable value for the attribute may be stored. During operation, the location will be accessed by the agent to obtain the value. The URL may also contain variable values that may be used to guide the selection of the most suitable value of the attributes. These variable values may be fixed or can be selected at run time either from global system data or data specific to the individual employee. Thus the employee work location may be loaded at run time by the agent into a variable in the URL to guide the selection of proper values for his/her service attribute.

The use of a URL to indicate a location is only one example. Other ways of indicating location such as an object id may also be used.

Various combinations of these methods of selecting values may be used. That is the result of an evaluation function may be a URL or other location indicator. In such an embodiment the agent runs the evaluation function and obtains a location indicator as a result. In some embodiments, an agent obtains an evaluation function on access to a location and then evaluates this function. In some embodiments, the result of an evaluation function may be another evaluation function and in some embodiments the result found at a location may be another location indicator. These combinations may be nested as required with no limit to the nesting. Limits may be selected for the convenience of individual embodiments.

The disclosure has so far described the novel structure of agent and template, which allows administrators to manage user settings at the level of user role and not at the level of individual attributes. This eases the workload on the administrator, reduces the possibility of error and allows for the use of less highly trained and therefore less costly personnel.

The disclosure now addresses the issue of the management of multiple services for individual employee role attribute settings. The employee is assigned a role with a class of service that may, in many if not most cases, span multiple services. The technology of this disclosure may be extended, in some embodiments, to address this issue.

Figure 5:
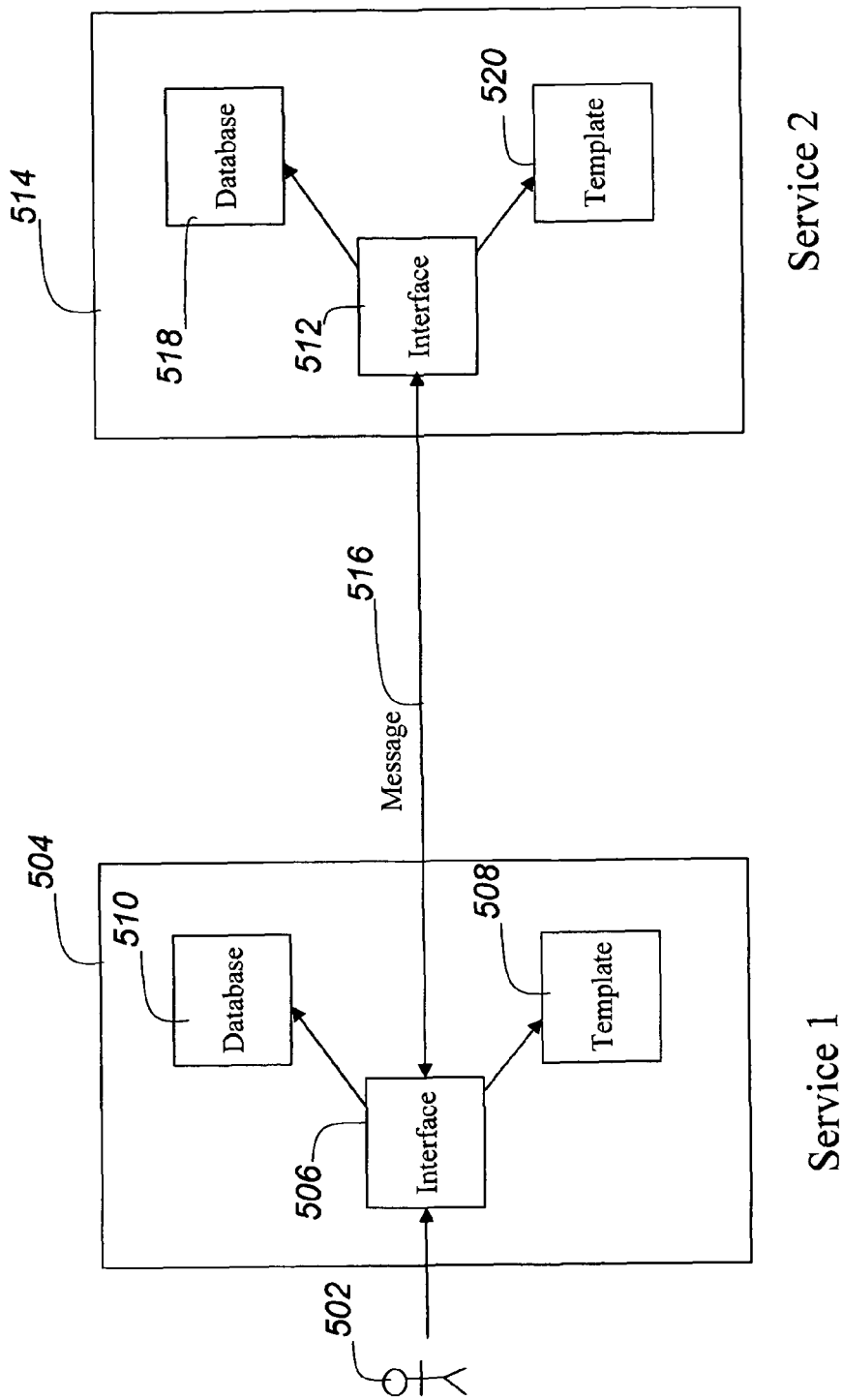
FIG. 5 illustrates sharing information across services for the system of FIG. 3.

FIG. 5 shows an administrator 502 managing a service 504 through use of the technology of this disclosure. The administrator 502 is accessing the agent interface 506, which in turn accesses the template 508 to update the service database 510. The administrator 502 supplies the agent with at a minimum the employee's identifier and the selected role. FIG. 5, illustrates that the agent within one service 504 may also supply this data to other agents in other services 514. FIG. 5, for the sake of clarity, shows a connection to only one other service but any number of services may be notified of the update.

In some embodiments, this update may take the form of a message 516. The message comprises the employee identifier and the selected role and possibly other information. This message is sent in some manner (to be described below) to other services 514. Agent interface 512 at the recipient services 514 update the user settings in their associated database 518 using the settings indicated by their templates 520.

In some embodiments, it can be assumed that the services have received common data about employees, at least to the level of their personal identifier that is used in the messaging, through data synchronization mechanisms that are known to the art. However in other embodiments, this process can be provided as part of the update protocol described in this disclosure. Each update message can include the user identifier and such related information as the employees preferred name, work location etc. This data may be indicated by a location indicator (e.g. a URL) carried in the message and as well as specific representations may be used. If a service 514 receives such a message 516, it first determines if a record for the employee already exists in its database 518. If it does not, then a record is created and populated with template data using the methods described above.

In some embodiments, this protocol can be extended to include function codes. So for example, one function code could indicate that an employee record is to be deleted and another function code could indicate that the employee record is to be updated.

In some embodiments, the update protocol may be extended to supply return indications. Recipient services may send reply messages indicating the success or failure of their attempt to update the employee record. This reply may contain an indication of the type of failure. Types of failure may comprise, unknown user (for those embodiments in which user creation is outside the scope of the protocol), unknown class of service, database unavailable etc. These return messages will be received by the originating agent and an indication can be given to the administrator of the success or failure of the update and on which services the update failed. The administrator may then take any remedial action required.

The transmission of messages may take several forms as chosen for the convenience of different embodiments. In some embodiments, the originating agent may be supplied with a list of network address of other services. In other embodiments, a central proxy may be provided that forwards messages to other services. Services wishing to receive update messages will determine this proxy's location by some method (e.g. a service location protocol, programming by its own administrator and hard coding) and register with it. This proxy may be supplied as part of one of more services. In other embodiments, a publish/subscribe mechanism may be used to perform this proxy function.

In operation, when using the technology of this disclosure, an administrator at the interface of one service may enter updates for individual employee role attributes that is effected at all relevant services within the system. Each service is supplied with one or more templates that are appropriate to various employee roles. These templates may be supplied with each service by the service vendor and or be created and populated as needed by the enterprise. Certain templates may be industry standards and used as such. Such templates can be defined by standards bodies and implemented into the standard software loads of individual services. Certain templates, such as those of compliance officers, emergency personnel, may be mandated. These may be supplied as standard templates by the creators and suppliers of services.

Numerous modifications, variations and adaptations may be made to the particular embodiments described above without departing from the scope patent disclosure, which is defined in the claims.

What is claimed is:

1. A system for sharing between services, comprising:
    a first service having a first interface and a first database, the first service being configured to enable an employee of an organization to perform an employee role;
    the first interface including an agent and at least one template for a user service class;
    a second service having a second interface for coupling to the template referenced by the first service and a second database separate from the first database, the second service being configured to enable the employee of the organization to perform the employee role; and
    hardware for running the first and second services;
    whereby the first interface accepts information from an administrator about the employee to populate a template and passes the accepted information about the employee to the second service for use and interpretation by the second service;
    wherein the information about the employee includes identification of the employee and identification of the employee role;
    wherein the template includes a table of attributes and values, the information about the employee comprising some of the values;
    wherein the first service uses an evaluation function script including one or more predicates for selecting a value for one or more attributes in the template based on a value of one or more other attributes in the template;
    wherein the template includes a location link at which one or more of the values for the employee are stored; and
    wherein the agent is used to identify the employee role through the first interface and the agent is configured to access the template and update the values for the attributes of the template.

2. The system of claim 1, wherein the first interface allows values to be selected from a group of predetermined values.

3. The system of claim 1, wherein the first interface allows user input of values from the administrator.

4. The system of claim 1, wherein the first interface provides a drop-down menu from which the administrator selects values for the employee.

5. A method of sharing comprising:
    interfacing with a first service via an agent and at least one template for a user service class using a first interface, the user service class relating to an employee role, and the template including a table of attributes and values relating at least in part to responsibilities or privileges associated with the employee role;
    accepting information about an employee from an administrator through the first interface and using the agent, the information about the employee including identification of the employee and identification of the employee role;
    automatically populating one or more additional values of the template, by the agent, the agent being configured to access the template and update the values for the attributes of the template using an evaluation function script including one or more predicates for selecting the one or more additional values for one or more attributes in the template based on a value of one or more other attributes in the template; and
    passing information about the employee from the first service to a second service for use by the second service, the first and second services enabling the employee to perform the employee role.

6. The method of claim 5, wherein the first interface allows values to be selected from a group of predetermined values.

7. The method of claim 5, wherein the first interface provides a location link at which one or more of the values for the employee are stored.

8. The method of claim 5, wherein the first interface allows input of values.

9. A system for sharing comprising:
    a first service having a first interface and a first database device, the first service being configured to enable an employee of an organization to perform an employee role;
    the first interface including an agent and at least one template for a user service class, the template including a table of attributes and values relating at least in part to responsibilities or privileges associated with the employee role;
    a second service having a second interface for coupling to the template referenced by the first service and a second database device, the second service being configured to enable the employee of the organization to perform the employee role; and
    hardware for running the first and second services;
    wherein the agent enables the first interface to accept information about the employee and the agent is configured to populate the template and pass information about the employee to the second service for use and interpretation by the second service, the information about the employee including identification of the employee and identification of the employee role; and
    wherein the agent is configured to access the template and automatically populate one or more additional values of the template based on a value of one or more other attributes in the template.

10. The system of claim 9, wherein the first interface allows values to be selected from a group of predetermined values.

11. The system of claim 9, wherein the first interface provides an evaluation function as the means for automatically populating one or more additional values of the template.

12. The system of claim 9, wherein the first interface provides a location link at which one or more of the values for the employee are stored.

13. The system of claim 9, wherein the first interface allows user input of values.

14. The system of claim 9, wherein the first interface provides a drop-down menu for determining values.

15. The system of claim 1, wherein the one or more values stored at the location link are variable.

16. The system of claim 1, wherein the one or more values stored at the location link are fixed.

17. The system of claim 1, wherein the location link is a URL.

* * * * *